United States Patent
Okuike

(10) Patent No.: US 12,088,927 B2
(45) Date of Patent: Sep. 10, 2024

(54) IMAGING DEVICE AND IMAGING METHOD

(71) Applicant: Sony Semiconductor Solutions Corporation, Kanagawa (JP)

(72) Inventor: Kazuyuki Okuike, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 489 days.

(21) Appl. No.: 17/607,590

(22) PCT Filed: Apr. 28, 2020

(86) PCT No.: PCT/JP2020/018197
§ 371 (c)(1),
(2) Date: Oct. 29, 2021

(87) PCT Pub. No.: WO2020/230635
PCT Pub. Date: Nov. 19, 2020

(65) Prior Publication Data
US 2022/0224830 A1      Jul. 14, 2022

(30) Foreign Application Priority Data
May 10, 2019   (JP) .................................. 2019-090224

(51) Int. Cl.
*H04N 23/80* (2023.01)
*G06V 20/60* (2022.01)
*H04N 23/45* (2023.01)

(52) U.S. Cl.
CPC ............. *H04N 23/80* (2023.01); *G06V 20/60* (2022.01); *H04N 23/45* (2023.01); *G06V 2201/07* (2022.01)

(58) Field of Classification Search
CPC ........ H04N 23/80; H04N 23/45; H04N 23/61; H04N 23/617; H04N 23/90; H04N 23/951; G06V 20/60; G06V 10/96; G06V 2201/07
See application file for complete search history.

(56) References Cited

U.S. PATENT DOCUMENTS

2012/0154352 A1    6/2012  Yamashita
2019/0370978 A1*  12/2019  Hashimoto ............ G06V 10/82
(Continued)

FOREIGN PATENT DOCUMENTS

CN        106461774 A     2/2017
CN        107409176 A    11/2017
(Continued)

OTHER PUBLICATIONS

International Search Report (PCT/ISA/210), International Application No. PCT/JP2020/018197, dated Jul. 14, 2020.

*Primary Examiner* — Kelly L Jerabek
(74) *Attorney, Agent, or Firm* — Michael Best & Friedrich LLP

(57) ABSTRACT

An imaging device (1) according to the present disclosure includes a plurality of image sensors (sensors 11, 12, 13, and 14) that output detection results to a processing device by sharing one signal line. At least one of the image sensors (sensors 11, 12, 13, and 14) includes an imaging unit (21), a recognition unit (23), and an output unit (25). The imaging unit (21) captures an image to generate image data. The recognition unit (23) recognizes a predetermined target object from the image data. The output unit (25) outputs the recognition result of the recognition unit (23) to the processing device in a period that does not overlap with a period in which the detection result of each of other image sensors (Continued)

is output using the signal line in one frame period in which the imaging unit (21) captures one image.

10 Claims, 15 Drawing Sheets

(56) References Cited

U.S. PATENT DOCUMENTS

2020/0342258 A1\* 10/2020 Uno ..................... G06V 10/82
2021/0216747 A1\* 7/2021 Rodyushkin ............ G06N 3/08

FOREIGN PATENT DOCUMENTS

| | | |
|---|---|---|
| CN | 107767696 A | 3/2018 |
| CN | 109155814 A | 1/2019 |
| JP | 2010-279004 A | 12/2010 |
| JP | 2013048333 A | 3/2013 |
| JP | 2017-211864 A | 11/2017 |
| KR | 20080073073 A | 8/2008 |
| KR | 20100130339 A | 12/2010 |
| TW | 201904281 A | 1/2019 |
| WO | WO-2017175492 A1 | 10/2017 |

\* cited by examiner

FIG.8
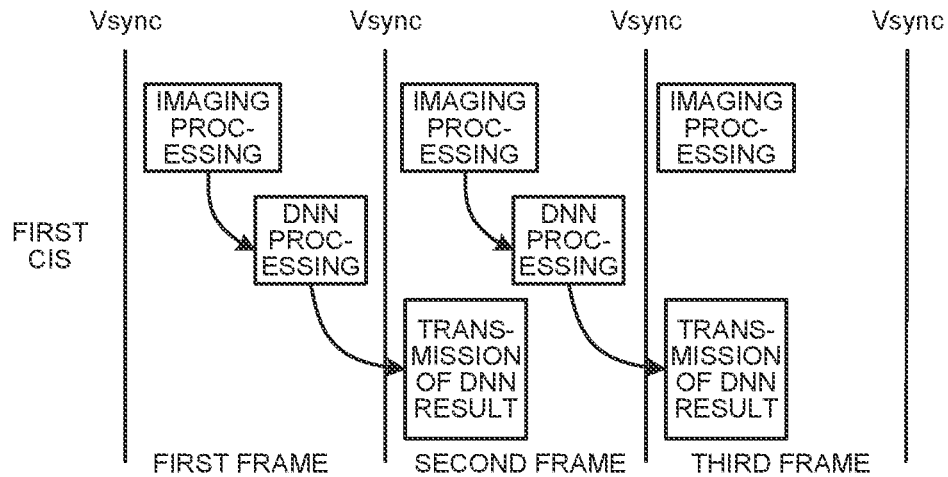
FIG.9
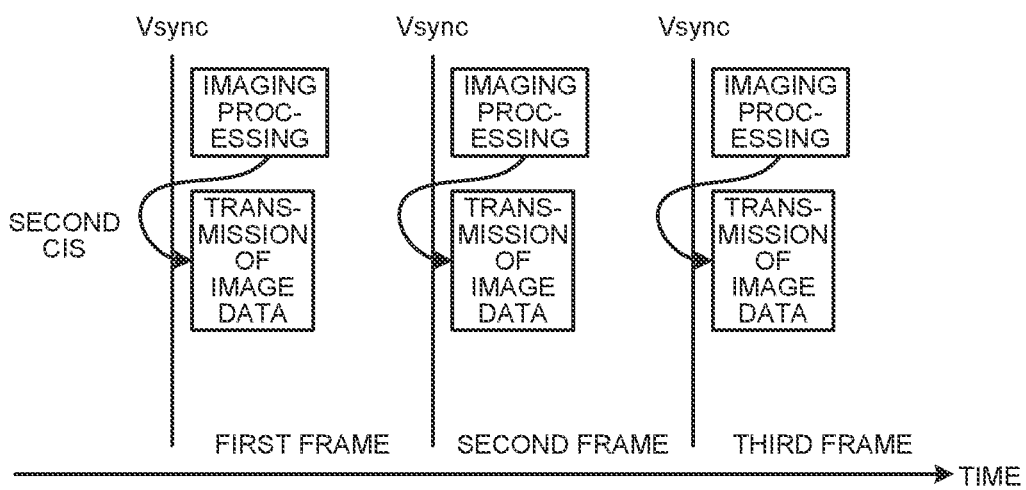
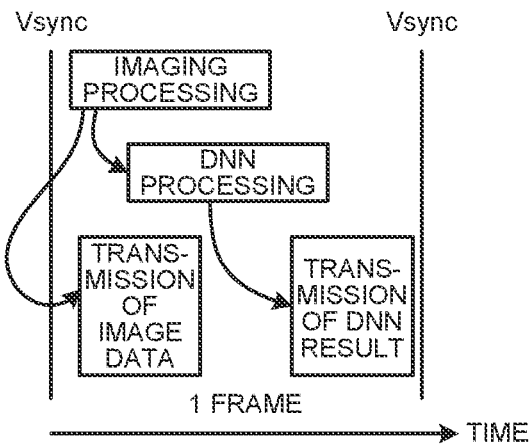

Frame-by-frame INTERLEAVING

Line-by-line INTERLEAVING

IMAGING DEVICE AND IMAGING METHOD

FIELD

The present disclosure relates to an imaging device and an imaging method.

BACKGROUND

There is a system including a processing device and a plurality of image sensors, in which the processing device recognizes a subject in a captured image based on image data received from the plurality of image sensors. In such a system, when the processing device and the plurality of image sensors are individually connected by signal lines, it is necessary to provide a plurality of reception interfaces in the processing device.

Therefore, there is a technology for reducing the number of reception interfaces provided in the processing device by connecting the processing device and the plurality of image sensors by one signal line and transmitting image data from the plurality of image sensors to the processing device in a time division manner (for example, Patent Literature 1).

CITATION LIST

Patent Literature

Patent Literature 1: JP 2017-211864 A

SUMMARY

Technical Problem

However, in the above-described technology according to the related art, since the image data are transmitted from the plurality of image sensors to the processing device in a time division manner, a frame rate of the captured image decreases.

Therefore, the present disclosure proposes an imaging device and an imaging method capable of reducing the number of reception interfaces provided in a processing device without decreasing a frame rate of a captured image.

Solution to Problem

An imaging device according to the present disclosure includes a plurality of image sensors that output detection results to a processing device by sharing one signal line. At least one of the image sensors includes an imaging unit, a recognition unit, and an output unit. The imaging unit captures an image to generate image data. The recognition unit recognizes a predetermined target object from the image data. The output unit outputs the recognition result of the recognition unit to the processing device in a period that does not overlap with a period in which the detection result of each of other image sensors is output using the signal line in one frame period in which the imaging unit captures one image.

BRIEF DESCRIPTION OF DRAWINGS

FIG. 8 is an explanatory diagram illustrating an example of the operation of the imaging device according to the present disclosure.

FIG. 9 is an explanatory diagram illustrating an example of the operation of the imaging device according to the present disclosure.

DESCRIPTION OF EMBODIMENTS

Hereinafter, embodiments of the present disclosure will be described in detail with reference to the drawings. Note that, in each of the following embodiments, the same reference signs denote the same portions, and an overlapping description will be omitted.

[1. Overview of Configuration of Imaging Device]

Figure 1:
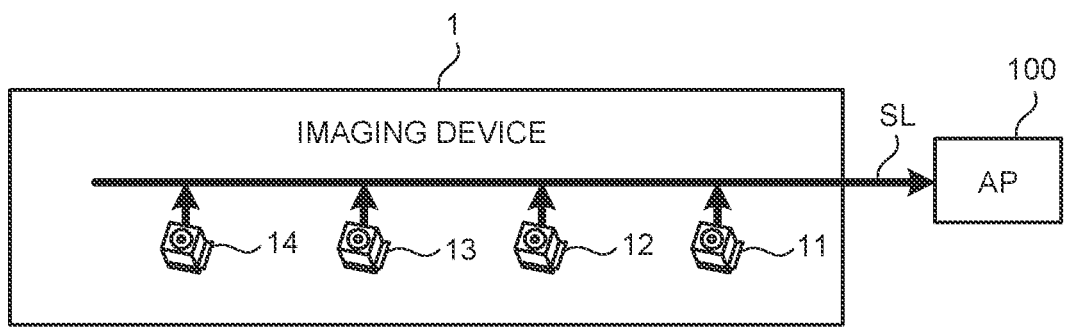
FIG. 1 is an explanatory diagram illustrating an overview of a configuration of an imaging device according to the present disclosure.

FIG. 1 is an explanatory diagram illustrating an overview of a configuration of an imaging device according to the present disclosure. As illustrated in FIG. 1, an imaging device 1 according to the present disclosure includes a plurality of (here, four) image sensors (hereinafter, simply referred to as sensors) 11, 12, 13, and 14.

Note that the number of sensors included in the imaging device 1 is not limited to four, and may be two or more. For example, in a case where the plurality of sensors 11, 12, 13, and 14 are mounted on a vehicle, the sensors are provided separately at four positions on the front side, rear side, left side, and right side of the vehicle, respectively. Furthermore, in a case where the imaging device 1 is used as, for example, a stereo camera, two sensors 11 and 12 are integrally provided.

The sensors 11, 12, 13, and 14 are, for example, complementary metal oxide semiconductor image sensors (CISs). Note that some or all of the sensors 11, 12, 13, and 14 may be charge coupled device (CCD) image sensors or other sensors adopting a time of flight (ToF) method.

The sensors 11, 12, 13, and 14 are connected to an application processor (hereinafter, referred to as AP 100), which is an example of a processing device, by one signal line SL, and transmit detection results to the AP 100 in a time division manner by sharing the signal line SL.

The AP 100 executes processing based on the detection results of the sensors 11, 12, 13, and 14. For example, in a case where the imaging device 1 is mounted on a vehicle, the AP 100 detects the presence of a pedestrian or a preceding vehicle based on the detection results, and executes processing of notifying an advanced driver assistance system (ADAS) of information indicating the presence or the like.

As described above, in the imaging device 1, since the plurality of sensors 11, 12, 13, and 14 transmit the detection result to the AP 100 by sharing one signal line SL, the number of reception interfaces provided in the AP 100 can be one.

However, in the imaging device 1, when image data of captured images are transmitted from the plurality of sensors 11, 12, 13, and 14 to the AP 100 in a time division manner as the detection results, a frame rate of the captured image decreases. Such a problem will be described next.

[2. Problem Caused by Transmitting Image Data in Time Division Manner]

Figure 2:
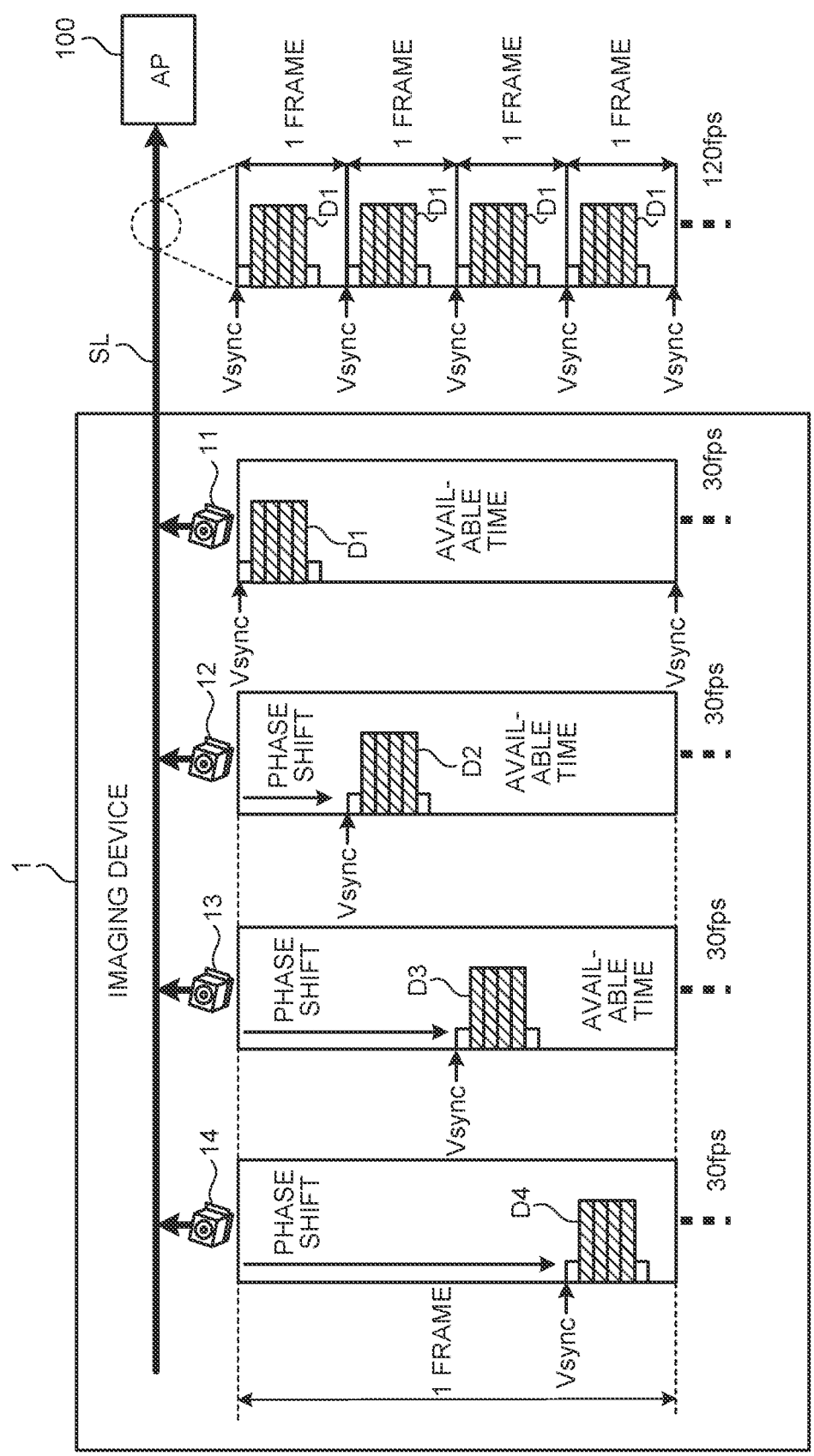
FIG. 2 is an explanatory diagram illustrating a problem caused by transmitting image data in a time division manner according to the present disclosure.

FIG. 2 is an explanatory diagram illustrating a problem caused by transmitting image data in a time division manner according to the present disclosure. For example, in a case where only the sensor 11 is connected to the AP 100 and the frame rate at which the sensor 11 can capture an image is 120 fps, image data D1 of the captured image can be transmitted from the sensor 11 to the AP 100 via the signal line SL at a frame rate of 120 fps.

However, in a case where the four sensors 11, 12, 13, and 14 are connected to the AP 100 by one signal line SL, and image data are transmitted from the respective sensors 11, 12, 13, and 14 to the AP 100 in a time division manner, the imaging device 1 needs to decrease the frame rate.

For example, in a case where the image data D1, D2, D3, and D4 are transmitted to the AP 100 in a time division manner in the order of the sensor 11, the sensor 12, the sensor 13, and the sensor 14, the sensor 12 cannot transmit the image data D2 of the sensor 12 during transmission of the image data D1 of the sensor 11.

Therefore, the sensor 12 needs to shift (delay) the phase of a transmission timing (Vsync: vertical synchronization signal) of the image data D2 until the transmission of the image data D1 by the sensor 11 is completed. Similarly, the sensors 13 and 14 also need to sequentially shift (delay) the phase of transmission timings (Vsync: vertical synchronization signal) of the image data D3 and D4.

As a result, the imaging device 1 needs to extend one frame period, and even in a case where each of the sensors 11, 12, 13, and 14 can perform imaging at a frame rate of 120 fps, the frame rate needs to be decreased to 30 fps that corresponds to ¼.

Therefore, the imaging device 1 has a configuration capable of reducing the number of reception interfaces provided in the AP 100 without decreasing the frame rate of the captured image. Next, a configuration of the imaging device 1 will be described.

[3. Configuration of Imaging Device]

Figure 3:
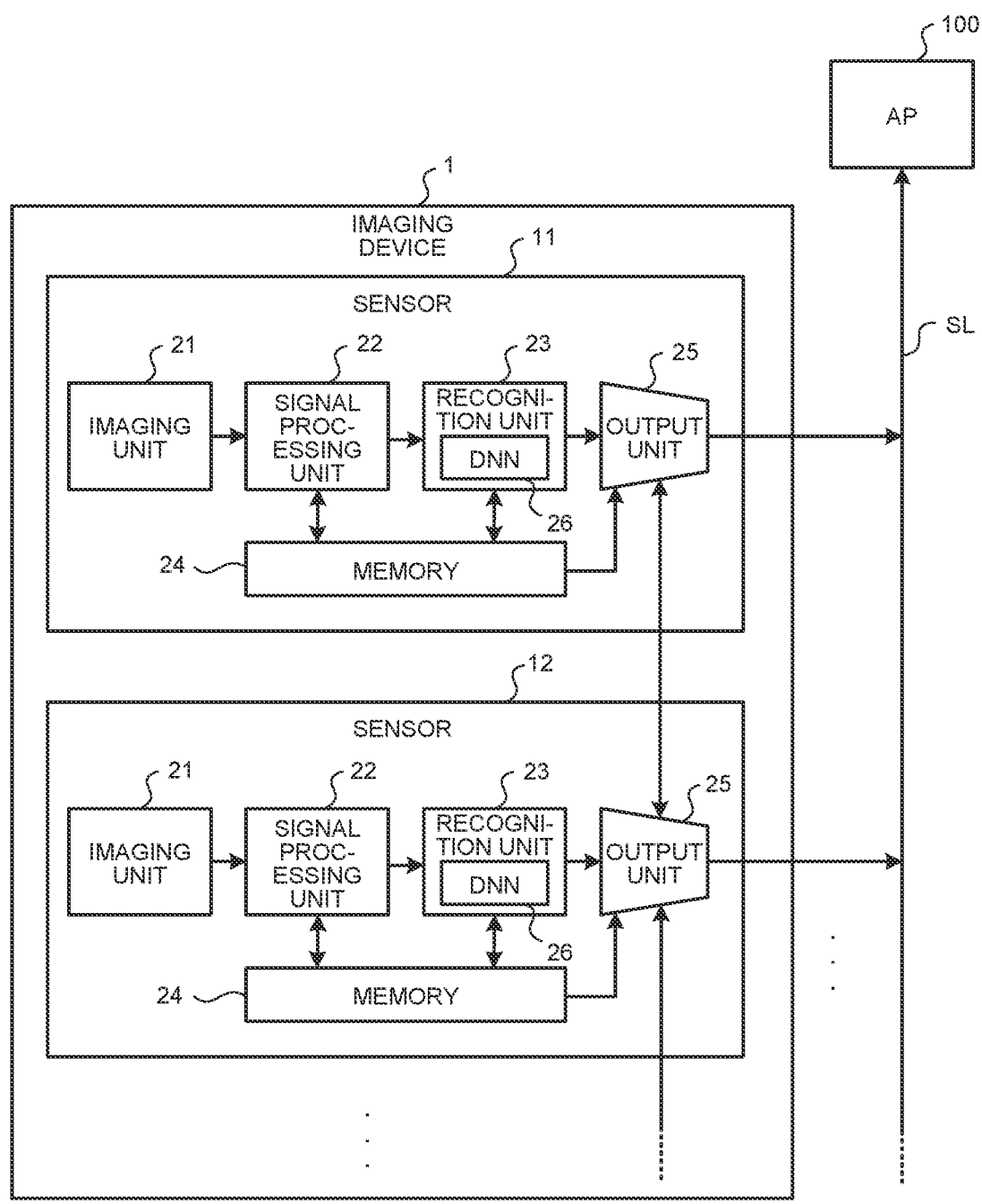
FIG. 3 is an explanatory diagram illustrating an example of the configuration of the imaging device according to the present disclosure.

FIG. 3 is an explanatory diagram illustrating an example of the configuration of the imaging device according to the present disclosure. Note that the four sensors 11, 12, 13, and 14 have the same configuration. Therefore, in FIG. 3, the sensors 11 and 12 are selectively illustrated, and the sensors 13 and 14 are not illustrated. Here, the configuration of the sensor 11 will be mainly described, and an overlapping description of the sensors 12, 13, and 14 will be omitted.

As illustrated in FIG. 3, the imaging device 1 includes the sensor 11, the sensor 12, and the sensors 13 and 14 (not illustrated). The sensors 11, 12, 13, and 14 are connected to the AP 100 by one signal line SL, and transmit the respective detection results to the AP 100 in a time division manner by sharing the signal line SL.

The sensor 11 includes an imaging unit 21, a signal processing unit 22, a recognition unit 23, a memory 24, and an output unit 25. Note that other sensors 12, 13, and 14 also have a similar configuration as that of the sensor 11. The imaging unit 21 includes a lens, a photoelectric transformation element, an analog/digital (A/D) conversion unit, and the like.

The imaging unit 21 photoelectrically transforms light incident through the lens into signal charges according to the amount of received light by the photoelectric transformation element, and converts the analog signal charges into a digital pixel signal by the A/D conversion unit to generate image data. The imaging unit 21 outputs the generated image data to the signal processing unit 22.

The signal processing unit 22, the recognition unit 23, and the output unit 25 are processing units implemented by, for example, a microcomputer including a central processing unit (CPU), a read only memory (ROM), a random access memory (RAM), and the like, and various circuits. The memory 24 is, for example, an information storage device such as a static random access memory (SRAM) or a dynamic random access memory (DRAM).

The signal processing unit 22 executes predetermined signal processing on the image data input from the imaging unit 21, and outputs the processed image data to the recognition unit 23 and the memory 24. For example, the signal processing unit 22 executes signal processing such as shading correction, color mixing correction, gain adjustment, white balance adjustment, demosaicing, and gamma correction on the image data, and outputs the image data subjected to the signal processing to the recognition unit 23 and the memory 24.

The recognition unit 23 includes a deep neural network (DNN) 26 which is an example of a machine learning model. The DNN 26 is an algorithm having a multilayer structure in which a human cranial nerve circuit (neural network) designed by machine learning so as to recognize a feature (pattern) of a subject from image data is used as a model.

The recognition unit 23 recognizes the subject in the image data by inputting the image data input from the signal processing unit 22 or the image data read from the memory 24 to the DNN 26 and executing the DNN processing. Then, the recognition unit 23 outputs the DNN result output from the DNN 26 to the output unit 25 as a recognition result.

Note that the recognition unit 23 may be configured to recognize the subject from the image data by using a machine learning model other than the DNN, such as a convolutional neural network (CNN) or a support vector machine (SVM).

The output unit 25 outputs the DNN result input from the recognition unit 23 to the AP 100 as a detection result. At this time, the output unit 25 outputs the DNN result to the AP 100 in a period that does not overlap with a period in which the detection result of each of other sensors 12, 13, and 14 is output using the signal line SL in one frame period in which the imaging unit 21 captures one image.

That is, the output unit 25 serially transmits the detection results of other sensors 12, 13, and 14 and the DNN result of the recognition unit 23 to the AP 100 in a time division manner within one frame period.

Similarly, each of other sensors 12, 13, and 14 also outputs the DNN result to the AP 100 in a period that does not overlap with a period in which the detection result of another sensor is output using the signal line SL in one frame period in which one image is captured.

Here, the DNN result has a much smaller data amount than the image data. Therefore, the imaging device 1 can output, for example, the DNN results output from the four sensors 11, 12, 13, and 14 to the AP 100 in a time division manner within one frame period without extending the length of one frame period.

As a result, the imaging device 1 outputs the detection results of all the sensors 11, 12, 13, and 14 to the AP 100 using one signal line SL without decreasing the frame rate of the captured image, such that the number of reception interfaces provided in the AP 100 can be one.

Note that the output unit 25 of the sensor 11 can also output the image data stored in the memory 24 to the AP 100. However, the output unit 25 of the sensor 11 outputs the image data to the AP 100 in a period that does not overlap with a period in which the recognition result of the recognition unit 23 of the sensor 11 is output in one frame period.

Furthermore, in a case where the DNN results are output from other sensors 12, 13, and 14, the sensor 11 can output only the image data to the AP 100 without outputting the DNN result. Similarly, other sensors 12, 13, and 14 can output one or both of the DNN result and the image data to the AP 100.

The output unit 25 of each of the four sensors 11, 12, 13, and 14 performs bidirectional communication and transmits data selected from the DNN result and the image data to the AP 100 so as not to decrease the frame rate. Next, an example of an operation of the imaging device 1 will be described.

[4. Example of Operation of Imaging Device]

FIGS. 4 to 12 are explanatory diagrams illustrating examples of the operation of the imaging device according to the present disclosure. Note that, in FIGS. 4 to 8, in order to facilitate understanding of the operation of the imaging device 1, it is assumed that the imaging device 1 includes two image sensors 11 and 12. In addition, in FIGS. 4 to 8, the sensor 11 will be referred to as a first CIS, and the sensor 2 will be referred to as a second CIS.

Figure 4:
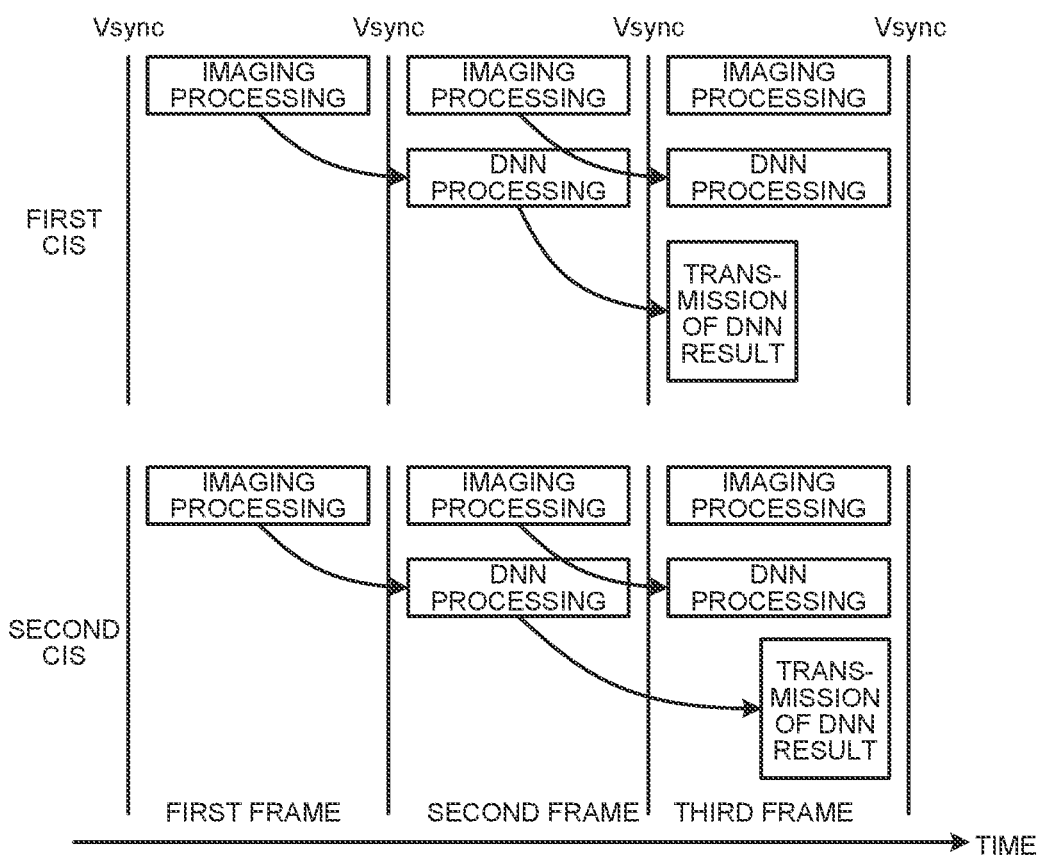
FIG. 4 is an explanatory diagram illustrating an example of an operation of the imaging device according to the present disclosure.

As illustrated in FIG. 4, in a first operation example, the first CIS and the second CIS first execute imaging processing of an image of the first frame. Then, the first CIS and the second CIS execute DNN processing of the image data of the first frame simultaneously with imaging processing of an image of the second frame.

Then, the first CIS and the second CIS execute DNN processing of the image data of the second frame simultaneously with imaging processing of an image of the third frame. At the same time, the first CIS and the second CIS transmit the DNN result of the image data of the first frame to the AP 100 in a time division manner without temporally overlapping.

As described above, the first CIS and the second CIS can transmit the DNN processing results of the image data to the AP 100, respectively, in a time division manner by sharing one signal line SL without extending the frame period within one frame period in which the image of the third frame is captured.

Then, for the fourth frame and subsequent frames, the first CIS and the second CIS simultaneously execute imaging processing, DNN processing of image data of the first previous frame, and transmission of a DNN result of the second previous frame. As a result, the imaging device 1 can reduce the number of reception interfaces provided in the AP 100 to one without decreasing the frame rate of the captured image.

Figure 5:
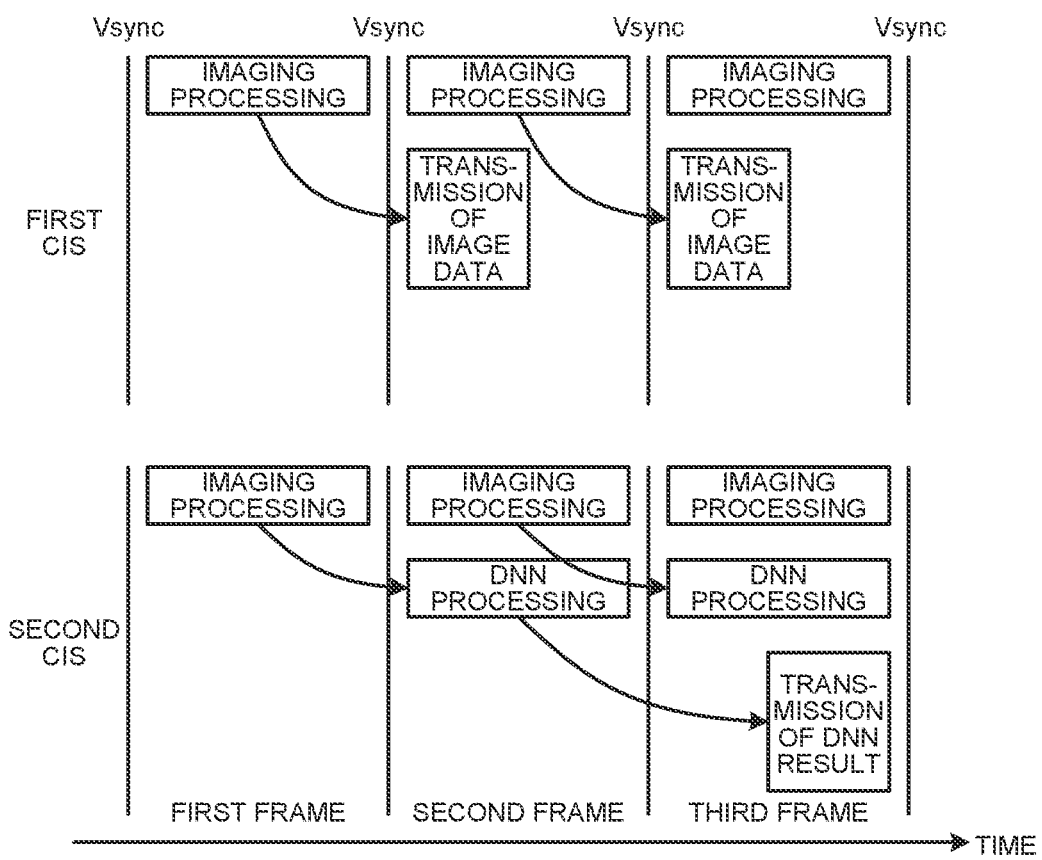
FIG. 5 is an explanatory diagram illustrating an example of the operation of the imaging device according to the present disclosure.

Further, as illustrated in FIG. 5, in a second operation example, the first CIS and the second CIS first execute imaging processing of an image of the first frame. Then, the first CIS performs transmission of the image data of the first frame to the AP 100 simultaneously with imaging processing of an image of the second frame. Meanwhile, the second CIS executes DNN processing of the image data of the first frame simultaneously with the imaging processing of the image of the second frame.

Thereafter, the first CIS and the second CIS execute imaging processing of an image of the third frame. At the same time, the first CIS transmits the image data of the second frame to the AP 100. Meanwhile, the second CIS executes the DNN processing of the image data of the second frame, and at the same time, transmits the DNN result of the image data of the first frame to the AP 100 in a period that does not overlap with a period in which the first CIS transmits the image data.

In this manner, the first CIS and the second CIS can transmit the image data and the DNN processing result to the AP 100 in a time division manner without temporally overlapping by sharing one signal line SL within one frame period in which the image of the third frame is captured without extending the frame period.

Then, the first CIS performs transmission of image data of the first previous frame to the AP 100 simultaneously with imaging processing for the fourth frame and subsequent frames. Meanwhile, for the fourth frame and subsequent frames, the second CIS simultaneously executes imaging processing, DNN processing of image data of the first previous frame, and transmission of a DNN result of the second previous frame. As a result, the imaging device 1 can reduce the number of reception interfaces provided in the AP 100 to one without decreasing the frame rate of the captured image.

Figure 6:
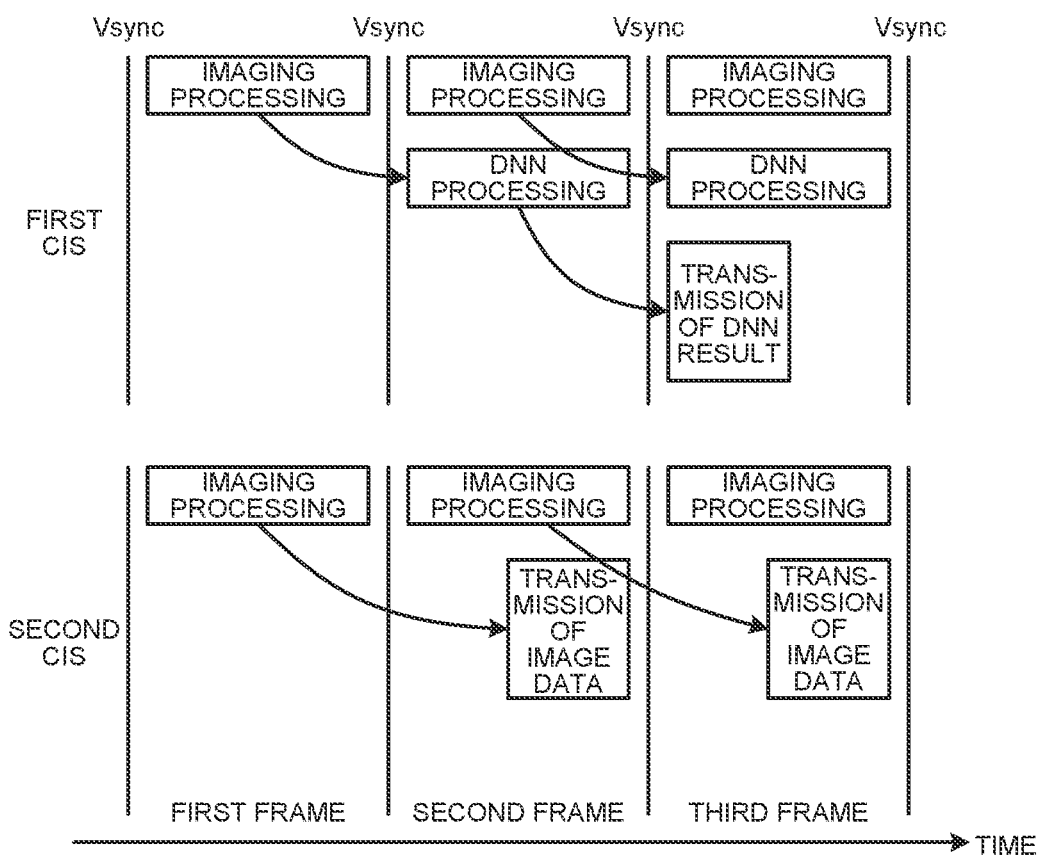
FIG. 6 is an explanatory diagram illustrating an example of the operation of the imaging device according to the present disclosure.

Further, as illustrated in FIG. 6, in a third operation example, the first CIS and the second CIS first execute imaging processing of an image of the first frame. Then, the first CIS executes DNN processing of the image data of the first frame simultaneously with the imaging processing of the image of the second frame. Meanwhile, the second CIS performs transmission of the image data of the first frame to the AP 100 simultaneously with imaging processing of an image of the second frame.

Thereafter, the first CIS and the second CIS execute imaging processing of an image of the third frame. At the same time, the first CIS performs transmission of the DNN result of the image data of the first frame to the AP 100 simultaneously with DNN processing of the image data of the second frame. Meanwhile, the second CIS transmits the image data of the second frame to the AP 100 in a period that does not overlap with a period in which the DNN result of the first frame is transmitted by the first CIS.

As described above, the first CIS and the second CIS can transmit the DNN processing results and the image data to the AP 100 in a time division manner by sharing one signal line SL without extending the frame period within one frame period in which the image of the third frame is captured.

Further, for the fourth frame and subsequent frames, the first CIS simultaneously executes imaging processing, DNN processing of image data of the first previous frame, and transmission of a DNN result of the second previous frame. Meanwhile, the second CIS performs transmission of image data of the first previous frame to the AP 100 simultaneously with imaging processing for the fourth frame and subsequent frames. As a result, the imaging device 1 can reduce the number of reception interfaces provided in the AP 100 to one without decreasing the frame rate of the captured image.

Figure 7:
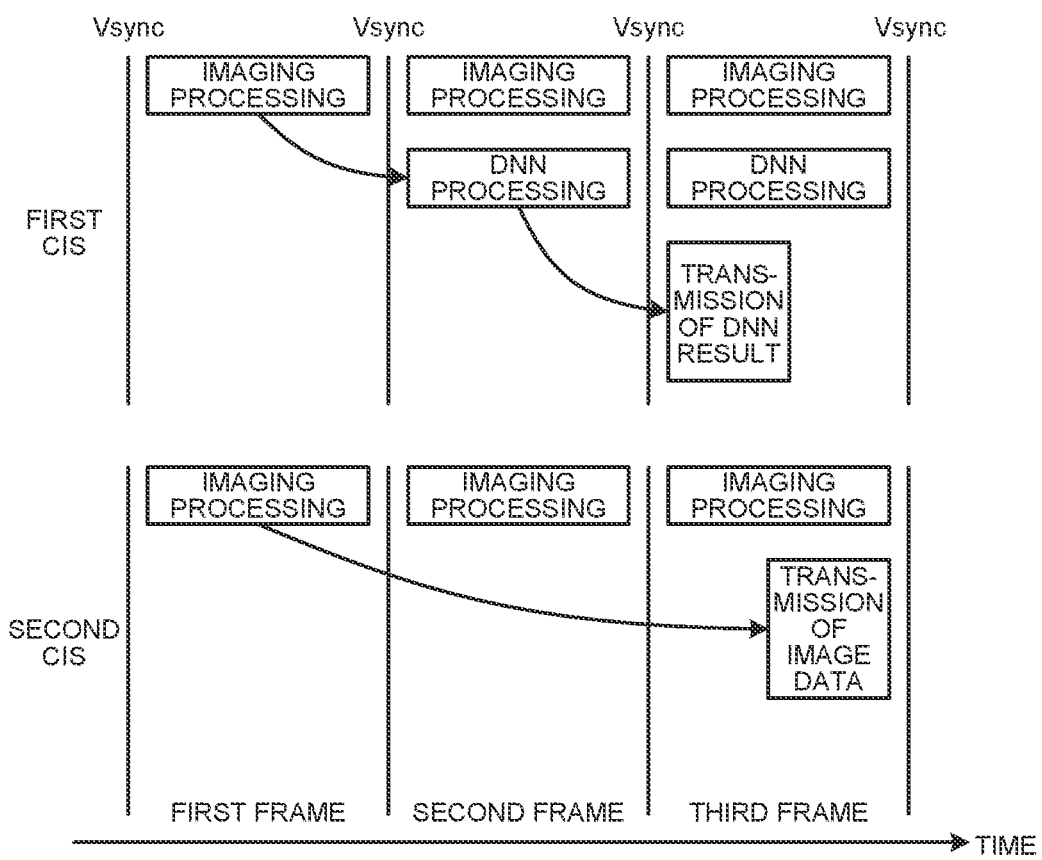
FIG. 7 is an explanatory diagram illustrating an example of the operation of the imaging device according to the present disclosure.

Further, as illustrated in FIG. 7, in a fourth operation example, the first CIS and the second CIS first execute imaging processing of an image of the first frame. Thereafter, the first CIS and the second CIS execute imaging processing of an image of the second frame.

At the same time, the first CIS performs DNN processing of the image data of the first frame. Meanwhile, the second CIS holds the image data of the first frame in the memory 24. Note that the second CIS may hold the image data by using a floating diffusion of the photoelectric transformation element included in the imaging unit 21 instead of the memory 24.

Thereafter, the first CIS and the second CIS execute imaging processing of an image of the third frame. At the same time, the first CIS executes DNN processing of image data of the first previous frame and transmits a DNN result of the second previous frame. Meanwhile, the second CIS transmits the held image data of the first frame to the AP 100 in a period that does not overlap with a period in which the DNN result is transmitted by the first CIS. For example, the first CIS notifies the second CIS of a transmission timing of the image data at this time.

As described above, the first CIS and the second CIS can transmit the DNN processing results and the image data to the AP 100 in a time division manner by sharing one signal line SL without extending the frame period within one frame period in which the image of the third frame is captured.

Further, for the fourth frame and subsequent frames, the first CIS simultaneously executes imaging processing, DNN processing of image data of the first previous frame, and transmission of a DNN result of the second previous frame. Meanwhile, the second CIS performs transmission of image data of the second previous frame to the AP 100 simultaneously with imaging processing for the fourth frame and subsequent frames.

As a result, the imaging device 1 can reduce the number of reception interfaces provided in the AP 100 to one without decreasing the frame rate of the captured image. Moreover, in the fourth operation example, in a case where the first CIS outputs the DNN result, which is the recognition result of the recognition unit 23, the first CIS causes the memory 24 of the second CIS to output image data generated by the second CIS at the same timing as the image data of the second previous frame from which a predetermined target object is recognized.

As a result, the imaging device 1 can transmit image data to be transmitted to the AP 100 and the DNN result of image data captured at the same timing as the image data to the AP 100 within the same frame period.

Furthermore, as illustrated in FIG. 8, in a fifth operation example, the first CIS first executes imaging processing of an image of the first frame within one frame period, and then executes DNN processing of the image data of the first frame. For example, the second CIS executes imaging processing of the image of the first frame at a timing at which the imaging processing of the first frame performed by the first CIS is completed and the DNN processing starts, and then transmits the image data subjected to the imaging processing to the AP 100.

For example, the first CIS executes imaging processing of an image of the second frame at a timing at which the imaging processing and the transmission of the image data performed by the second CIS are completed, and simultaneously transmits the DNN result of the first frame to the AP 100. Then, the first CIS performs DNN processing of an image data of the second frame.

For example, the second CIS executes the imaging processing of the second frame and performs the transmission of the image data at a timing at which the imaging processing of the second frame and the transmission of the DNN result of the first frame performed by the first CIS end and the DNN processing of the second frame starts.

Thereafter, the first CIS and the second CIS repeatedly perform the above-described operation. As a result, the image data can be transmitted to the AP 100 within each one frame period in which the second CIS captures an image, and the first CIS can transmit the DNN result to the AP 100 in a period that does not overlap with a period in which the image data is transmitted by the second SIC.

Note that, as described above, the DNN result has a much smaller data amount than the image data. Therefore, as in a sixth operation example illustrated in FIG. 9, each of the sensors 11, 12, 13, and 14 can also execute imaging processing, DNN processing, transmission of image data, and transmission of a DNN result within one frame period without greatly extending the frame period. At this time, each of the sensors 11, 12, 13, and 14 transmits the captured image data in a period that does not overlap with a period in which the DNN result indicating that the subject is recognized is transmitted.

Figure 10:
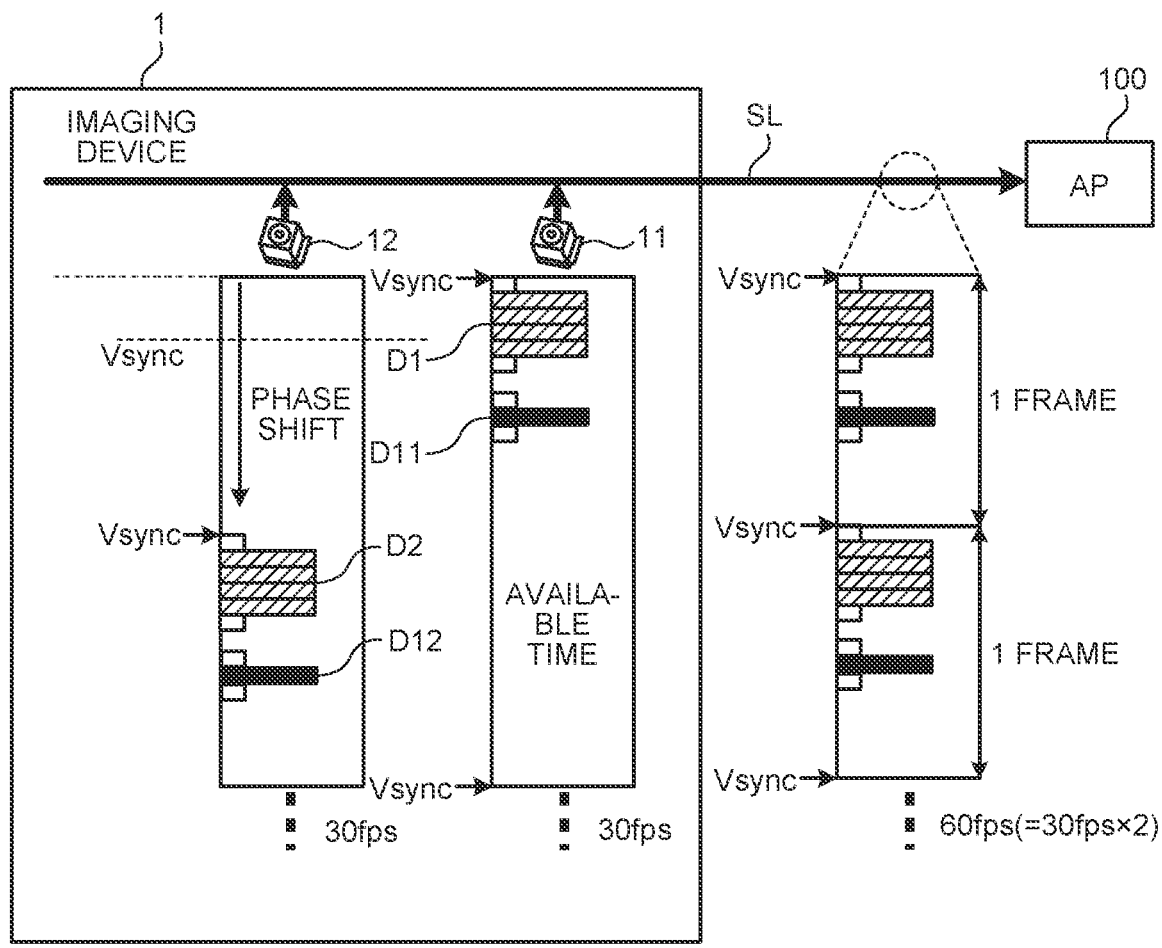
FIG. 10 is an explanatory diagram illustrating an example of the operation of the imaging device according to the present disclosure.

As a result, as illustrated in FIG. 10, for example, in a case where the frame rate of the sensors 11 and 12 is 30 fps, the imaging device 1 shifts the phase of Vsync of the sensor 12 until a timing at which the transmission of the image data D1 and a DNN result D11 performed by the sensor 11 ends.

Here, it is assumed that the shift amount of the phase of Vsync corresponds to, for example, a half of one frame period of the sensor 11. In such a case, the image data D1 and the DNN result D11, and the image data D2 and a DNN result D12 can be transmitted to the AP 100 at a frame rate of 60 fps via the signal line SL.

Figure 11:
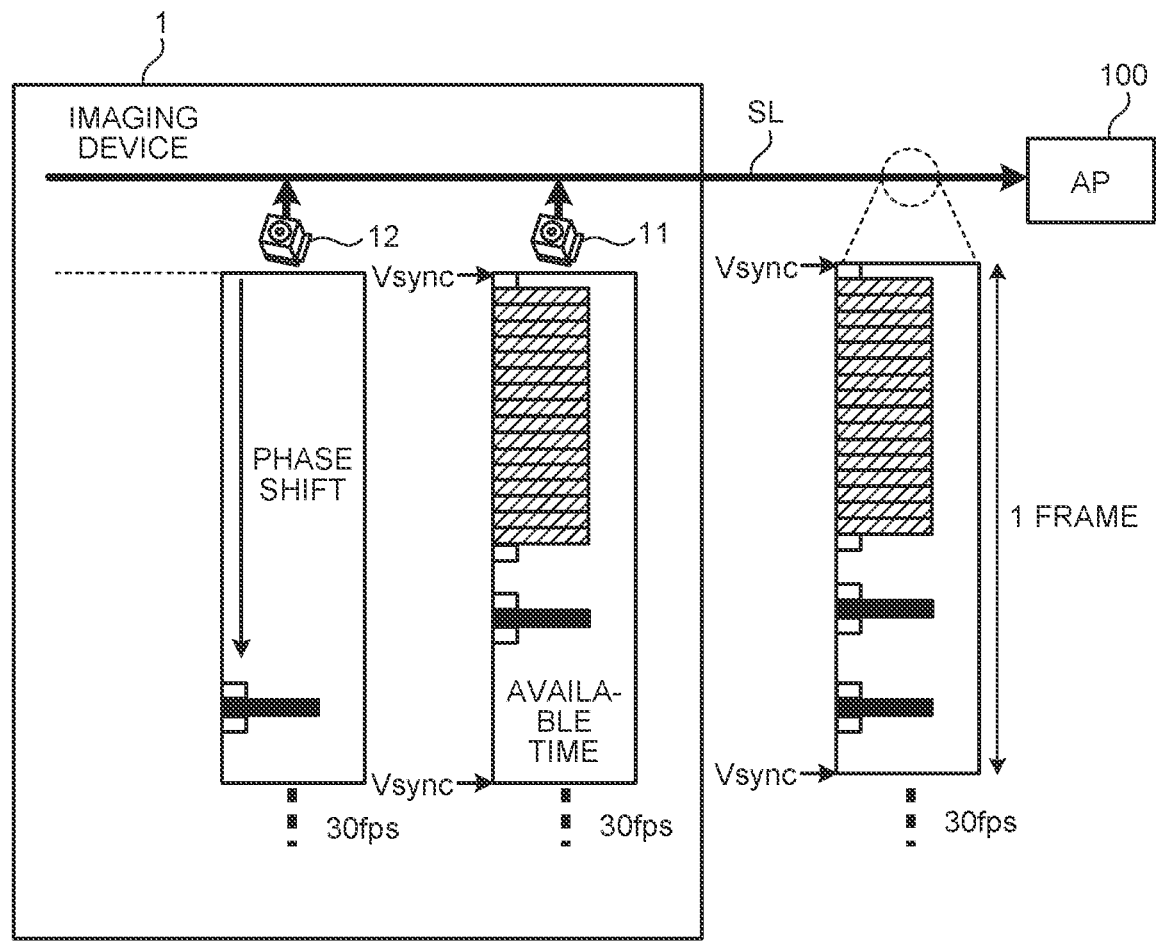
FIG. 11 is an explanatory diagram illustrating an example of the operation of the imaging device according to the present disclosure.

Furthermore, for example, as illustrated in FIG. 11, the imaging device 1 can also transmit the image data D1 of the sensor 11, the DNN result of the sensor 11, and the DNN result of the sensor 12 to the AP 100 in a time division manner within one frame period without decreasing the frame rate.

Figure 12:
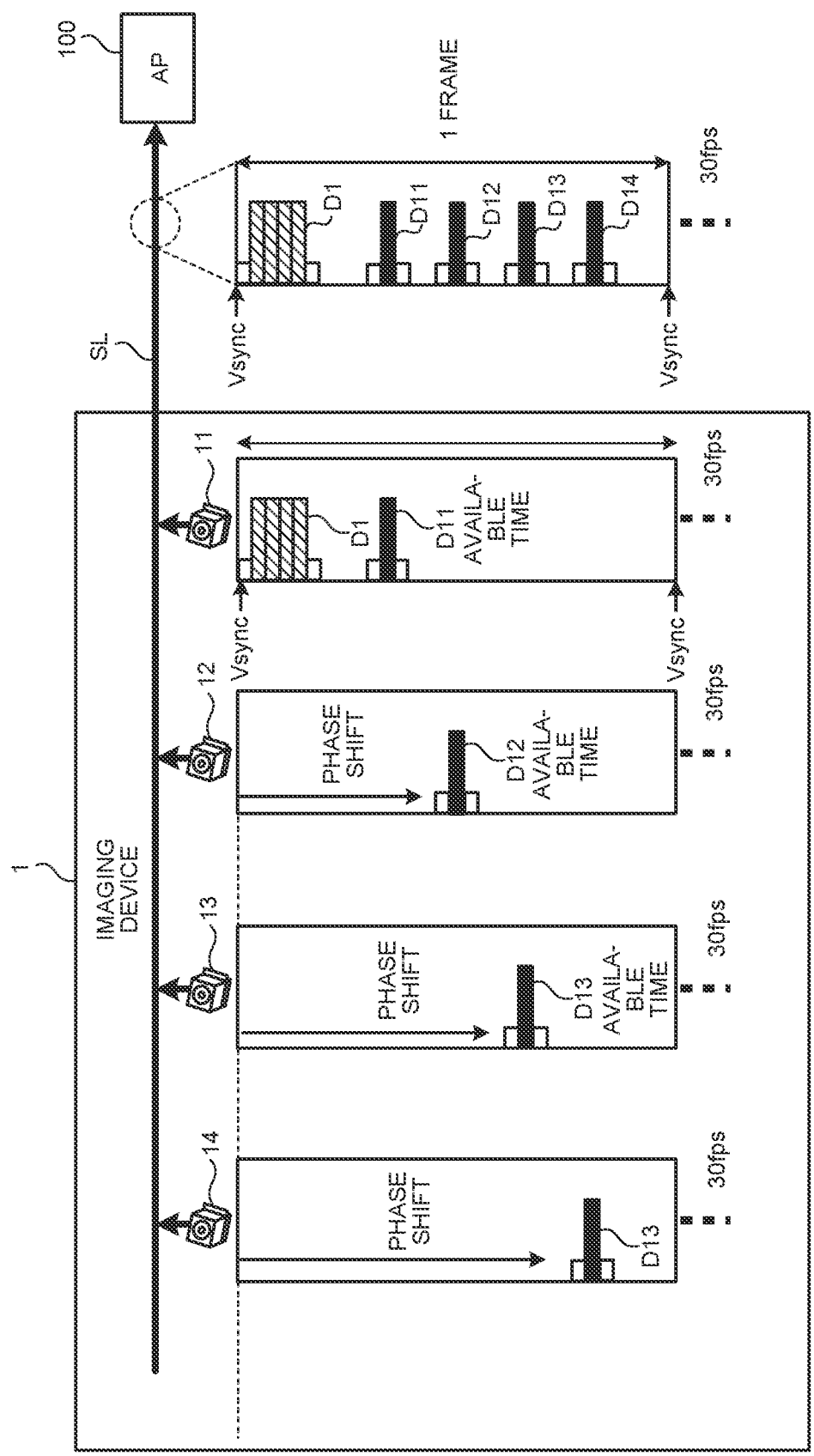
FIG. 12 is an explanatory diagram illustrating an example of the operation of the imaging device according to the present disclosure.

In this manner, the imaging device 1 can transmit one image data and DNN results of the plurality of sensors 11 and 12 to the AP 100 in a time division manner within one frame period. Therefore, for example, as illustrated in FIG. 12, the imaging device 1 can transmit the image data D1 and the DNN result D11 of the sensor 11, and the DNN results D12, D13, and D14 of the sensors 12, 13, and 14 to the AP 100 in a time division manner within one frame period without decreasing the frame rate.

[5. Example of Mounting of Imaging Device]

Figure 13:
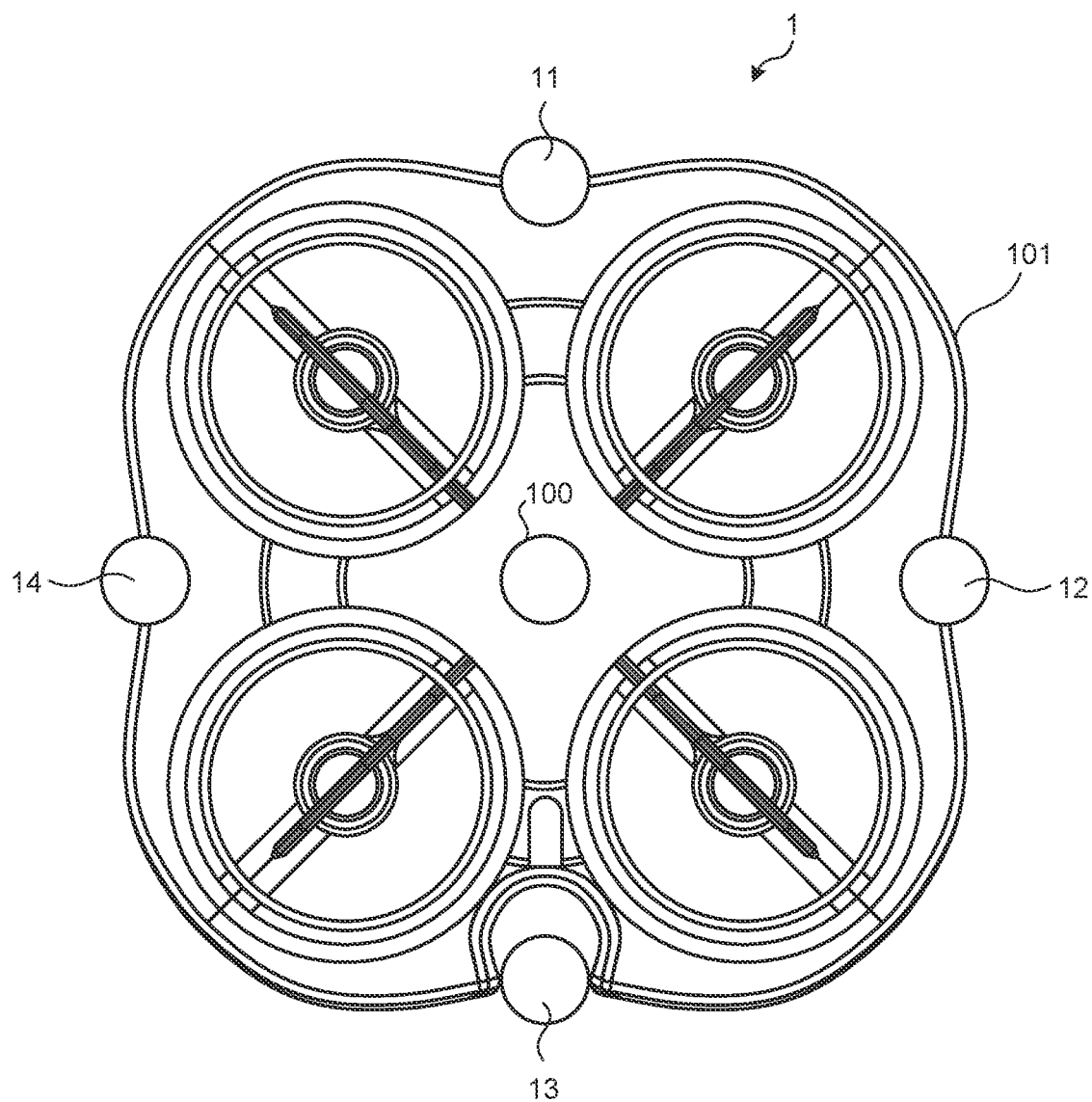
FIG. 13 is an explanatory diagram illustrating an example of mounting of the imaging device according to the present disclosure.

Next, FIG. 13 is an explanatory diagram illustrating an example of mounting of the imaging device according to the present disclosure. As illustrated in FIG. 13, the imaging device 1 is mounted on a drone 101, for example. In a case where the imaging device 1 is mounted on the drone 101, the sensors 11, 12, 13, and 14 are provided, for example, on the front side, rear side, left side, and right side of the drone 101. Note that the AP 100 is provided at the center of the drone 101, for example.

In such a case, in the imaging device 1, any one of the four sensors 11, 12, 13, and 14 transmits image data to the AP 100 in one frame period, and each of the four sensors 11, 12, 13, and 14 transmits a DNN result to the AP 100.

As a result, the imaging device 1 can transmit the image data from one of the four sensors 11, 12, 13, and 14 and the DNN results from all the sensors 11, 12, 13, and 14 to the AP 100 via one signal line SL without decreasing the frame rate.

Furthermore, the imaging device 1 can switch the sensors 11, 12, 13, and 14 that transmit the image data to the AP 100. In such a case, the imaging device 1 selects the sensors 11, 12, 13, and 14 to transmit the image data to the AP 100 based on the DNN result of the first previous frame.

For example, in a case where the sensor 11 transmits a DNN result indicating that the subject as an imaging target is recognized from an image of the first previous frame, the imaging device 1 causes the sensor 11 to transmit the image data, and causes all the sensors 11, 12, 13, and 14 to transmit the DNN results. As a result, the imaging device 1 can track and captures an image of the subject as the imaging target even in a case where the subject as the imaging target moves or the drone 101 changes its direction.

Furthermore, for example, the imaging device 1 can cause the four sensors 11, 12, 13, and 14 to sequentially transmit the image data once in one frame period, and cause all the sensors 11, 12, 13, and 14 to transmit the DNN results. Therefore, the imaging device 1 can monitor the surroundings of the drone 101.

[6. Time Division Method for Transmitted Data]

Figure 14:
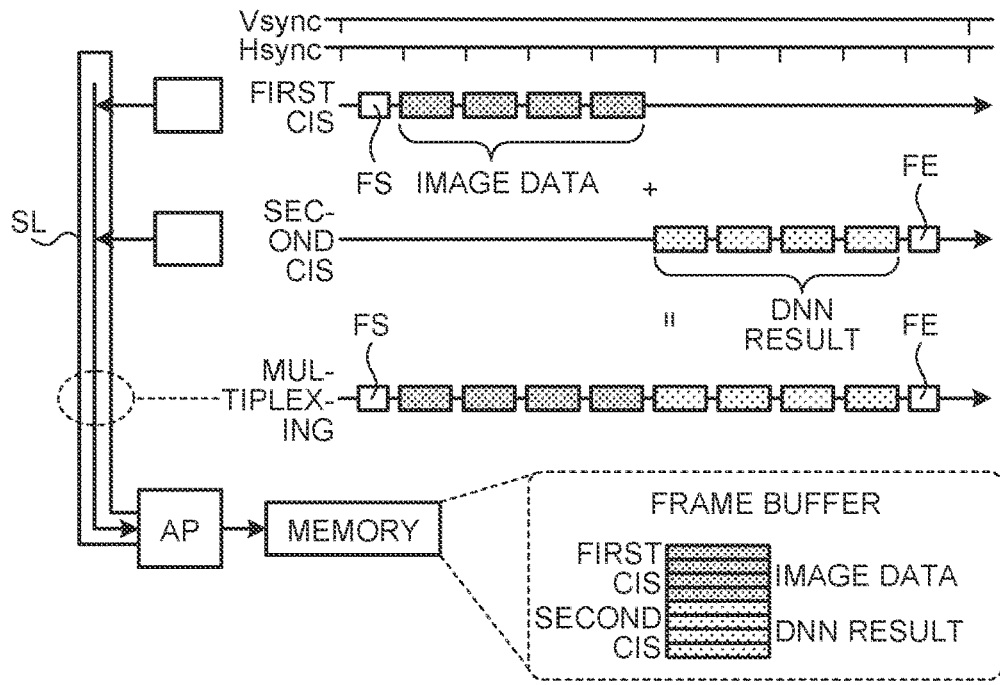
FIG. 14 is an explanatory diagram illustrating an example of a time division method for transmitted data performed by the imaging device according to the present disclosure.
Figure 15:
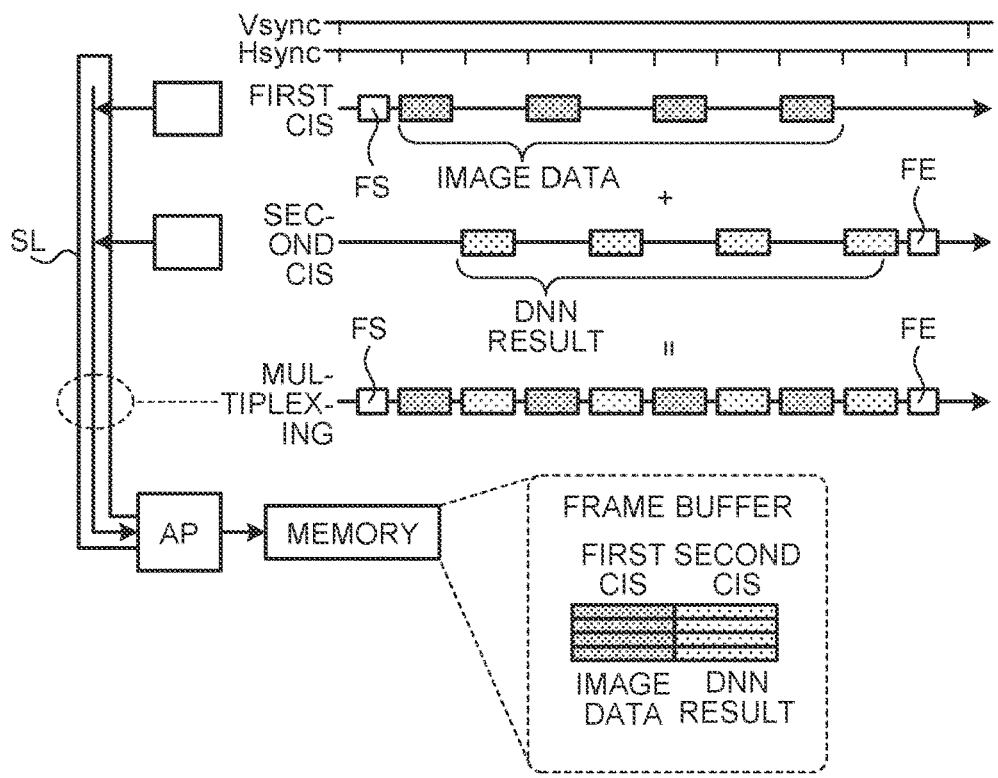
FIG. 15 is an explanatory diagram illustrating the example of the time division method for transmitted data performed by the imaging device according to the present disclosure.

Next, an example of a time division method for transmitted data performed by the imaging device will be described with reference to FIGS. 14 and 15. FIGS. 14 and 15 are explanatory diagrams illustrating an example of the time division method for transmitted data performed by the imaging device according to the present disclosure.

Here, a case where the imaging device 1 includes two sensors, the first CIS and the second CIS will be described as an example. Furthermore, here, a case where the first CIS transmits image data and the second CIS transmits a DNN result will be described.

As illustrated in FIG. 14, the imaging device 1 can transmit image data and a DNN result by, for example, frame-by-frame interleaving. In the frame-by-frame interleaving, the first CIS first transmits a frame start signal FS to the AP, and then sequentially transmits time-divided image data for one frame to the AP.

Thereafter, when the transmission of the image data performed by the first CIS is completed, the second CIS sequentially transmits the DNN results of the time-divided image data for one frame to the AP, and finally sequentially transmits a frame end signal FE to the AP. As a result, data obtained by multiplexing the frame start signal FS, the image data, the DNN data, and the frame end signal FE in this order is transmitted to the AP via the signal line SL.

Furthermore, as illustrated in FIG. 15, the imaging device 1 can also transmit image data and a DNN result by, for example, line-by-line interleaving. In the line-by-line interleaving, the first CIS and the second CIS first transmit the frame start signal FS to the AP.

Thereafter, the first CIS intermittently transmits divided data of time-divided image data for one frame to the AP. Meanwhile, the second CIS transmits divided data of a DNN result for one frame to the AP in each period from when each divided data is transmitted by the first CIS to when the next divided data is transmitted.

As a result, data obtained by alternately multiplexing the divided data of the image data and the divided data of the DNN result between the frame start signal FS and the frame end signal FE is transmitted to the AP via the signal line SL.

[7. Example of Application to Moving Body]

The technology (present technology) according to the present disclosure can be applied to various products. For example, the technology according to the present disclosure may be implemented as a device mounted in any one of moving bodies such as a vehicle, an electric vehicle, a hybrid electric vehicle, a motorcycle, a bicycle, a personal mobility device, a plane, a drone, a ship, and a robot.

Figure 16:
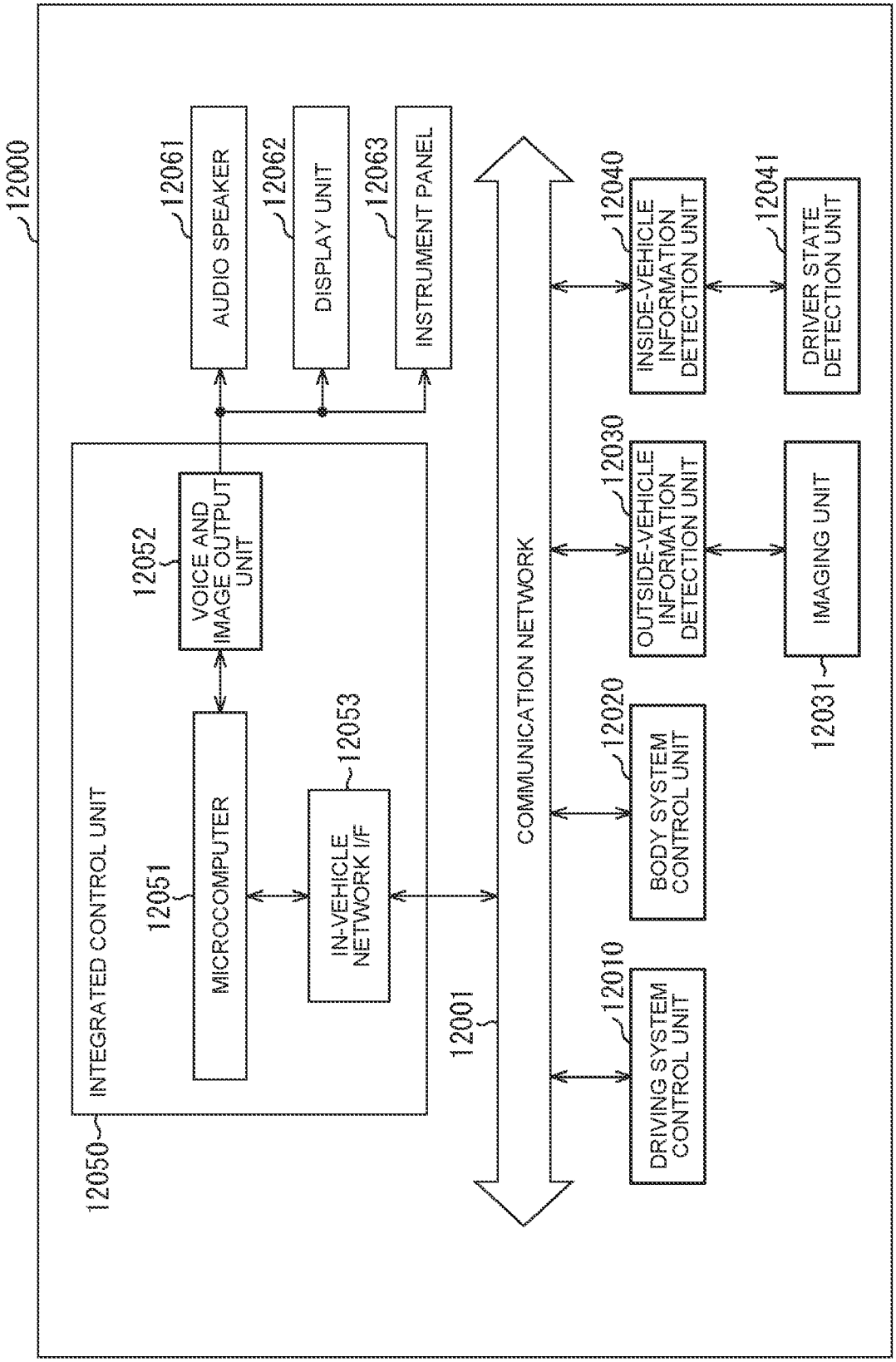
FIG. 16 is a block diagram illustrating an example of a schematic configuration of a vehicle control system.

FIG. 16 is a block diagram illustrating an example of a schematic configuration of a vehicle control system which is an example of a moving body control system to which the technology according to the present disclosure can be applied.

A vehicle control system 12000 includes a plurality of electronic control units connected through a communication network 12001. In the example illustrated in FIG. 16, the vehicle control system 12000 includes a driving system control unit 12010, a body system control unit 12020, an outside-vehicle information detection unit 12030, an inside-vehicle information detection unit 12040, and an integrated control unit 12050. Furthermore, as a functional configuration of the integrated control unit 12050, a microcomputer 12051, a voice and image output unit 12052, and an in-vehicle network interface (I/F) 12053 are illustrated.

The driving system control unit 12010 controls an operation of a device related to a driving system of a vehicle according to various programs. For example, the driving system control unit 12010 functions as a control device such as a driving force generation device for generating a driving force of a vehicle such as an internal combustion engine, a driving motor, or the like, a driving force transmission mechanism for transmitting a driving force to vehicle wheels, a steering mechanism for adjusting a steering angle of the vehicle, a brake device for generating a braking force of the vehicle, or the like.

The body system control unit 12020 controls an operation of various devices mounted in a vehicle body according to various programs. For example, the body system control unit 12020 functions as a keyless entry system, a smart key system, a power window device, or a control device for various lamps such as a head lamp, a back lamp, a brake lamp, a blinker, a fog lamp, and the like. In this case, electric waves sent from a portable machine substituting for a key and a signal of various switches can be input to the body system control unit 12020. The body system control unit 12020 receives the electric waves or the signal to control a door-lock device of a vehicle, a power window device, a lamp, or the like.

The outside-vehicle information detection unit 12030 detects information regarding an outside area of a vehicle in which the vehicle control system 12000 is mounted. For example, an imaging unit 12031 is connected to the outside-vehicle information detection unit 12030. The outside-vehicle information detection unit 12030 causes the imaging unit 12031 to capture an image of an area outside the vehicle, and receives the captured image. The outside-vehicle information detection unit 12030 may perform processing of detecting an object such as a person, a car, an obstacle, a sign, a letter on a road surface, or the like, or perform distance detection processing on the basis of the received image.

The imaging unit 12031 is an optical sensor that receives light and outputs an electric signal corresponding to the amount of received light. The imaging unit 12031 can output the electric signal as an image, or can output the electric signal as distance measurement information. Furthermore, the light received by the imaging unit 12031 may be visible light or invisible light such as infrared rays or the like.

The inside-vehicle information detection unit 12040 detects information regarding an inside area of the vehicle. For example, a driver state detection unit 12041 detecting a state of a driver is connected to the inside-vehicle information detection unit 12040. The driver state detection unit 12041 includes, for example, a camera capturing an image of the driver, and the inside-vehicle information detection unit 12040 may calculate a degree of fatigue or a degree of concentration of the driver, or discriminate whether or not the driver dozes off on the basis of detection information input from the driver state detection unit 12041.

The microcomputer 12051 can calculate a target control value of a driving force generation device, a steering mechanism, or a brake device on the basis of information regarding the inside area and the outside area of the vehicle, the information being acquired by the outside-vehicle information detection unit 12030 or the inside-vehicle information detection unit 12040, and output a control instruction to the driving system control unit 12010. For example, the microcomputer 12051 can perform a cooperative control for the purpose of implementing functions of an advanced driver assistance system (ADAS) including vehicle collision avoidance, impact alleviation, following traveling based on an inter-vehicle distance, traveling while maintaining a vehicle speed, a vehicle collision warning, a vehicle lane departure warning, or the like.

Furthermore, the microcomputer 12051 can perform a cooperative control for the purpose of an automatic driving in which a vehicle autonomously travels without an operation by a driver by controlling a driving force generation device, a steering mechanism, a brake device, or the like on the basis of information regarding a surrounding area of the vehicle acquired by the outside-vehicle information detection unit 12030 or the inside-vehicle information detection unit 12040, or the like.

Furthermore, the microcomputer 12051 can output a control instruction to the body system control unit 12020 on the basis of outside-vehicle information acquired by the outside-vehicle information detection unit 12030. For example, the microcomputer 12051 can perform a cooperative control for the purpose of preventing glare by controlling a headlamp according to a position of a preceding vehicle or an oncoming vehicle detected by the outside-vehicle information detection unit 12030 to switch a high beam to a low beam, or the like.

The voice and image output unit 12052 sends an output signal of at least one of voice or an image to an output device which is capable of visually or acoustically notifying a passenger of a vehicle or an outside area of the vehicle of information. In the example in FIG. 16, an audio speaker 12061, a display unit 12062, and an instrument panel 12063 are illustrated as the output devices. The display unit 12062 may include at least one of, for example, an on-board display or a head-up display.

Figure 17:
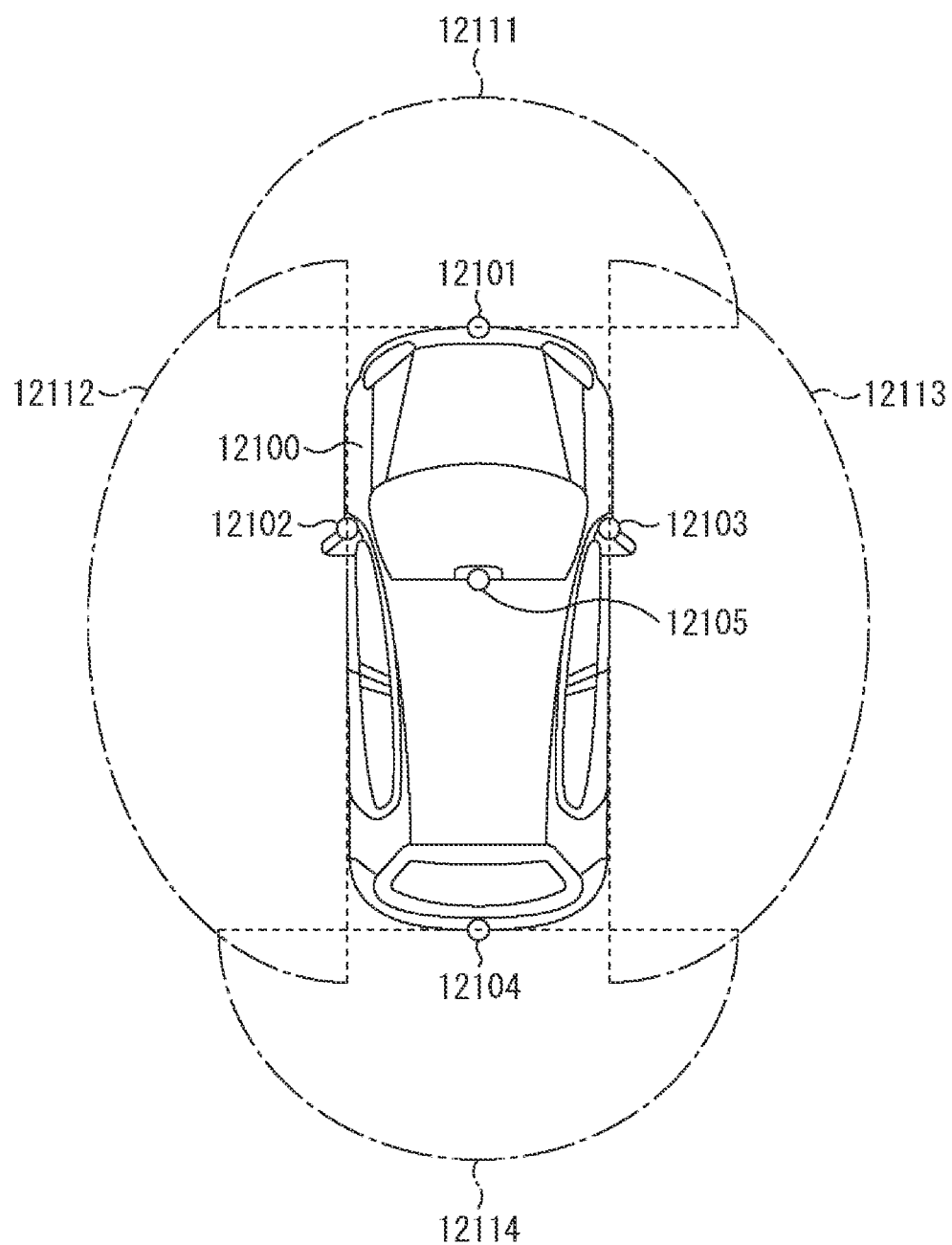
FIG. 17 is an explanatory diagram illustrating an example of installation positions of an outside-vehicle information detection unit and an imaging unit.

FIG. 17 is a diagram illustrating an example of an installation position of the imaging unit 12031.

In FIG. 17, a vehicle 12100 includes imaging units 12101, 12102, 12103, 12104, and 12105 as the imaging unit 12031.

The imaging units 12101, 12102, 12103, 12104, and 12105 are provided at, for example, a front nose, side mirrors, a rear bumper, a back door, an upper portion of a windshield in a compartment, and the like of the vehicle 12100. The imaging unit 12101 provided at the front nose and the imaging unit 12105 provided at the upper portion of the windshield in the compartment mainly acquire an image of an area in front of the vehicle 12100. The imaging units 12102 and 12103 provided at side mirrors mainly acquire images of areas on sides of the vehicle 12100. The imaging unit 12104 provided at the rear bumper or the back door mainly acquires an image of an area behind the vehicle 12100. The image of the area in front of the vehicle 12100 acquired by the imaging units 12101 and 12105 is mainly used to detect a preceding vehicle, a pedestrian, an obstacle, a traffic light, a traffic sign, a lane, or the like.

Note that FIG. 17 illustrates an example of imaging ranges of the imaging units 12101 to 12104. An image capturing range 12111 indicates an image capturing range of the imaging unit 12101 provided at the front nose, image capturing ranges 12112 and 12113 indicate image capturing ranges of the imaging units 12102 and 12103 provided at the side mirrors, respectively, and an image capturing range 12114 indicates an image capturing range of the imaging unit 12104 provided at the rear bumper or the back door. For example, image data captured by the imaging units 12101 to 12104 are superimposed, thereby obtaining a bird's eye view image from above the vehicle 12100.

At least one of the imaging units 12101 to 12104 may have a function of acquiring distance information. For example, at least one of the imaging units 12101 to 12104 may be a stereo camera including a plurality of image capturing elements, or may be an image capturing element with pixels for phase difference detection.

For example, the microcomputer 12051 can extract a three-dimensional object traveling at a predetermined speed (for example, 0 km/h or higher) in substantially the same direction as that of the vehicle 12100, particularly, the closest three-dimensional object on a traveling path of the vehicle 12100, as a preceding vehicle, by calculating a distance to each three-dimensional object in the image capturing ranges 12111 to 12114, and a temporal change (relative speed with respect to the vehicle 12100) in the distance on the basis of the distance information acquired from the imaging units 12101 to 12104. Moreover, the microcomputer 12051 can set an inter-vehicle distance to be secured in advance for a preceding vehicle, and can perform an automatic brake control (including a following stop control), an automatic acceleration control (including a following start control), and the like. As described above, a cooperative control for the purpose of an automatic driving in which a vehicle autonomously travels without an operation by a driver, or the like, can be performed.

For example, the microcomputer 12051 can classify and extract three-dimensional object data related to a three-dimensional object as a two-wheeled vehicle, an ordinary vehicle, a large vehicle, a pedestrian, and another three-dimensional object such as a power pole, on the basis of the distance information obtained from the imaging units 12101 to 12104, and use a result of the classification and extraction for automatic avoidance of obstacles. For example, the microcomputer 12051 identifies an obstacle around the vehicle 12100 as an obstacle that is visible to the driver of the vehicle 12100 or an obstacle that is hardly visible. Then, the microcomputer 12051 determines a collision risk indicating a risk of collision with each obstacle, and in a case where the collision risk is equal to or higher than a set value and there is a possibility of collision, the microcomputer 12051 can output an alarm to the driver through the audio speaker 12061 or the display unit 12062 or perform forced deceleration or avoidance steering through the driving system control unit 12010 to perform driving assistance for collision avoidance.

At least one of the imaging units 12101 to 12104 may be an infrared camera that detects infrared rays. For example, the microcomputer 12051 can recognize a pedestrian by determining whether or not a pedestrian is present in captured images of the imaging units 12101 to 12104. Such a recognition of a pedestrian is performed through a procedure for extracting feature points in the captured images of the imaging units 12101 to 12104 that are, for example, infrared cameras, and a procedure for discriminating whether or not an object is a pedestrian by performing pattern matching processing on a series of feature points indicating an outline of the object. In a case where the microcomputer 12051 determines that a pedestrian is present in the captured images of the imaging units 12101 to 12104 and recognizes the pedestrian, the voice and image output unit 12052 controls the display unit 12062 to superimpose a rectangular contour line for emphasis on the recognized pedestrian. Furthermore, the voice and image output unit 12052 may control the display unit 12062 to display an icon or the like indicating a pedestrian at a desired position.

Hereinabove, an example of the vehicle control system to which the technology according to the present disclosure can be applied has been described. The technology according to the present disclosure can be applied to, for example, the outside-vehicle information detection unit 12030, the imaging unit 12031, and the like in the configuration described above. For example, the imaging device 1 in FIG. 3 can be applied to the imaging unit 12031. By applying the technology according to the present disclosure to the imaging unit 12031, it is possible to reduce the number of reception interfaces provided in the in-vehicle network I/F 12053 without reducing the frame rate of the captured image.

[8. Effects]

As described above, the imaging device 1 includes the plurality of image sensors 11, 12, 13, and 14 that output the detection results to the AP 100, which is an example of the processing device, by sharing one signal line SL. At least one image sensor 11 includes the imaging unit 21, the recognition unit 23, and the output unit 25. The imaging unit 21 captures an image to generate image data. The recognition unit 23 recognizes a predetermined target object from the image data. The output unit 25 outputs the recognition result of the recognition unit 23 to the AP 100 in a period that does not overlap with a period in which the detection result of each of other sensors 12, 13, and 14 is output using the signal line SL in one frame period in which the imaging unit 21 captures an image. As a result, the imaging device 1 can reduce the number of reception interfaces provided in the AP 100 without decreasing the frame rate of the captured image.

Furthermore, other image sensors 12, 13, and 14 output the results of recognizing the predetermined target object as the detection results. The recognition results have a much smaller data amount than the image data. Therefore, the imaging device 1 can transmit the recognition results of the plurality of sensors to the AP 100 in one frame period without decreasing the frame rate of the captured image.

In addition, the output unit 25 outputs the image data generated by the imaging unit 21 in a period that does not overlap with a period in which the recognition result of the recognition unit 23 is output using the signal line SL in one frame period. As a result, the imaging device 1 can suppress a decrease in frame rate, for example, by causing only the image sensor 11 to transmit the image data and causing other image sensors 12, 13, and 14 to transmit the recognition results.

In addition, other image sensors 12, 13, and 14 output the image data as the detection results. As a result, the imaging device 1 can suppress a decrease in frame rate by causing any one of the image sensors 11, 12, 13, and 14 to transmit the image data and causing the others to transmit the recognition results.

Furthermore, each of other image sensors 12, 13, and 14 include the memory 24 that temporarily holds the image data. When outputting the recognition result of the recognition unit 23, the output unit 25 outputs image data generated at the same timing as the image data from which the predetermined target object is recognized from the memory 24 of each of the other image sensors 12, 13, and 14. As a result, the imaging device 1 can transmit image data to be transmitted to the AP 100 and the recognition result of image data captured at the same timing as the image data to the AP 100 within the same frame period.

Other image sensors 12, 13, and 14 capture images at timings different from that of the imaging unit 21. The output unit 25 outputs the recognition result of the recognition unit 23 within one frame period including a period in which the image data is output by each of other image sensors 12, 13, and 14. As a result, the imaging device 1 can suppress a decrease in frame rate by transmitting the recognition result of the image sensor 11 and the image data of other image sensors 12, 13, and 14 within the same one frame period.

Furthermore, the image sensor that transmits image data to the processing device within one frame period is any one of the plurality of image sensors 11, 12, 13, and 14. Therefore, the imaging device 1 can suppress a decrease in frame rate by suppressing the amount of data transmitted in one frame period.

Furthermore, the image sensor that transmits image data to the processing device within one frame period is determined based on a recognition result of the recognition unit 23 of the first previous frame. As a result, the imaging device 1 can track and image a subject as an imaging target by the plurality of image sensors 11, 12, 13, and 14, for example.

Furthermore, the image sensor that transmits image data to the processing device within one frame period is changed in order. As a result, the imaging device 1 can monitor the surroundings by, for example, the plurality of image sensors 11, 12, 13, and 14.

At least one of the plurality of image sensors 11, 12, 13, and 14 that output detection results to the AP 100, which is an example of the processing device, by sharing one signal line SL captures an image to generate image data, recognizes a predetermined target object from the image data, and outputs the result of recognizing the predetermined target object to the processing device in a period that does not overlap with a period in which the detection result of each of other image sensors is output using the signal line in one frame period in which one image is captured. As a result, an imaging method can reduce the number of reception interfaces provided in the AP 100 without decreasing the frame rate of the captured image.

Note that the effects in each embodiment described in the present specification are merely examples. The effects of the present disclosure are not limited thereto, and other effects may be obtained.

Note that the present technology can also have the following configurations.

(1)
An imaging device, including:
a plurality of image sensors that output detection results to a processing device by sharing one signal line,
wherein at least one of the image sensors includes:
an imaging unit that captures an image to generate image data;
a recognition unit that recognizes a predetermined target object from the image data; and
an output unit that outputs a recognition result of the recognition unit to the processing device in a period that does not overlap with a period in which the detection result of another image sensor is output using the signal line in one frame period in which the imaging unit captures one image.

(2)
The imaging device according to (1), wherein
the another image sensor outputs a result of recognizing the predetermined target object as the detection result.

(3)
The imaging device according to (1) or (2), wherein
the output unit outputs the image data generated by the imaging unit in a period that does not overlap with a period in which the recognition result of the recognition unit is output using the signal line in the one frame period.

(4)
The imaging device according to any one of (1) to (3), wherein
the another image sensor outputs the image data as the detection result.

(5)
The imaging device according to (4), wherein
the another image sensor includes a memory that temporarily holds the image data, and
in a case of outputting the recognition result of the recognition unit, the output unit outputs image data generated at the same timing as the image data from which the predetermined target object is recognized from the memory of the another image sensor.

(6)
The imaging device according to (4) or (5), wherein
the another image sensor captures the image at a timing different from that of the imaging unit, and
the output unit outputs the recognition result of the recognition unit within the one frame period including a period in which the image data is output by the another image sensor.

(7)
The imaging device according to any one of (1) to (6), wherein
the image sensor that transmits the image data to the processing device within the one frame period is any one of the plurality of image sensors.

(8)
The imaging device according to (7), wherein
the image sensor that transmits the image data to the processing device within the one frame period is determined based on a recognition result of the recognition unit of a first previous frame.

(9)
The imaging device according to claim 7), wherein
the image sensor that transmits the image data to the processing device within the one frame period is changed in order.

(10)
An imaging method performed by at least one of a plurality of image sensors that output detection results to a processing device by sharing one signal line, the imaging method including:
capturing an image to generate image data;
recognizing a predetermined target object from the image data; and
outputting a result of recognizing the predetermined target object to the processing device in a period that does not overlap with a period in which the detection result of another image sensor is output using the signal line in one frame period in which one image is captured.

REFERENCE SIGNS LIST

1 IMAGING DEVICE
11, 12, 13, 14 SENSOR
21 IMAGING UNIT
22 SIGNAL PROCESSING UNIT
23 RECOGNITION UNIT
24 MEMORY
25 OUTPUT UNIT
26 DNN
100 AP

The invention claimed is:

1. An imaging device, comprising:
a plurality of image sensors that output detection results to a processing device by sharing one signal line,
wherein at least one of the image sensors includes:
an imaging unit that captures an image to generate image data;
a recognition unit that recognizes a predetermined target object from the image data; and
an output unit that outputs a recognition result of the recognition unit to the processing device in a period that does not overlap with a period in which the detection result of another image sensor is output using the signal line in one frame period in which the imaging unit captures one image.

2. The imaging device according to claim 1, wherein
the another image sensor outputs a result of recognizing the predetermined target object as the detection result.

3. The imaging device according to claim 1, wherein
the output unit outputs the image data generated by the imaging unit in a period that does not overlap with a period in which the recognition result of the recognition unit is output using the signal line in the one frame period.

4. The imaging device according to claim 1, wherein
the another image sensor outputs the image data as the detection result.

5. The imaging device according to claim 4, wherein
the another image sensor includes a memory that temporarily holds the image data, and
in a case of outputting the recognition result of the recognition unit, the output unit outputs image data generated at the same timing as the image data from which the predetermined target object is recognized from the memory of the another image sensor.

6. The imaging device according to claim 4, wherein
the another image sensor captures the image at a timing different from that of the imaging unit, and
the output unit outputs the recognition result of the recognition unit within the one frame period including a period in which the image data is output by the another image sensor.

7. The imaging device according to claim 1, wherein
   the image sensor that transmits the image data to the processing device within the one frame period is any one of the plurality of image sensors.
8. The imaging device according to claim 7, wherein
   the image sensor that transmits the image data to the processing device within the one frame period is determined based on a recognition result of the recognition unit of a first previous frame.
9. The imaging device according to claim 7, wherein
   the image sensor that transmits the image data to the processing device within the one frame period is changed in order.
10. An imaging method performed by at least one of a plurality of image sensors that output detection results to a processing device by sharing one signal line, the imaging method comprising:
    capturing an image to generate image data;
    recognizing a predetermined target object from the image data; and
    outputting a result of recognizing the predetermined target object to the processing device in a period that does not overlap with a period in which the detection result of another image sensor is output using the signal line in one frame period in which one image is captured.

* * * * *